United States Patent [19]
Ellis

[11] 3,922,471
[45] Nov. 25, 1975

[54] SURFACE HAVING SEALING GLASS COMPOSITION THEREON

[75] Inventor: James L. Ellis, Toledo, Ohio

[73] Assignee: Owens-Illinois, Inc., Toledo, Ohio

[22] Filed: Apr. 1, 1974

[21] Appl. No.: 456,682

Related U.S. Application Data

[60] Division of Ser. No. 277,457, June 19, 1972, Pat. No. 3,888,686, which is a continuation of Ser. No. 831,648, June 9, 1969, abandoned.

[52] U.S. Cl. .............. 428/427; 428/426; 428/428; 428/432; 428/433
[51] Int. Cl.² ...................................... B32B 17/06
[58] Field of Search .............. 106/39.6, 299, 47, 53; 161/192, 193, 196; 117/124 A

[56] References Cited
UNITED STATES PATENTS

| | | | |
|---|---|---|---|
| 2,889,952 | 6/1959 | Claypoole | 220/2.1 |
| 3,113,878 | 12/1963 | Martin | 106/54 |
| 3,179,739 | 4/1965 | Ticde | 174/120 |
| 3,228,548 | 1/1966 | Butler | 220/2.1 |
| 3,250,631 | 5/1966 | Lusher | 106/47 R |
| 3,258,350 | 6/1966 | Martin et al. | 106/47 R |

FOREIGN PATENTS OR APPLICATIONS 625,448  6/1949  United Kingdom................ 106/299

*Primary Examiner*—George F. Lesmes
*Assistant Examiner*—Alan T. McDonald
*Attorney, Agent, or Firm*—Richard B. Dence; E. J. Holler

[57] ABSTRACT

Novel compositions of matter consisting of thermally crystallizable lead borosilicate and lead-zinc-borate sealing glasses having homogeneously blended therein a calcined zirconia vanadia silica stain.

5 Claims, 2 Drawing Figures

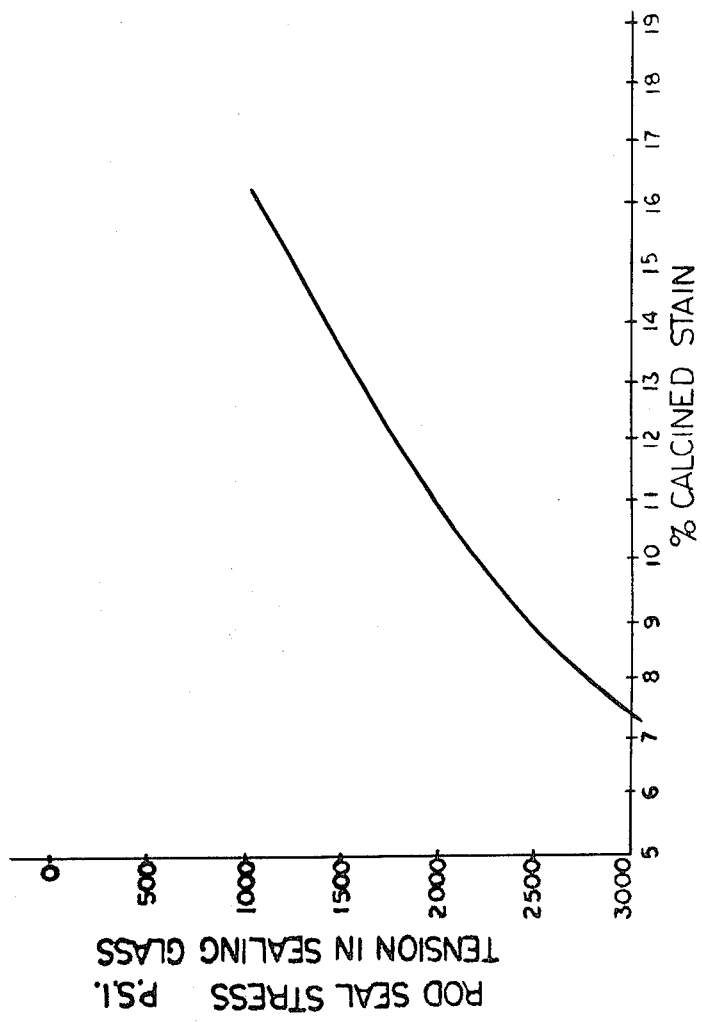

SURFACE HAVING SEALING GLASS COMPOSITION THEREON

This is a division of application Ser. No. 277,457 now U.S. Pat. No. 3,888,686 filed June 19, 1972, and which in turn is a continuation of prior application Ser. No. 831,648, filed June 9, 1969 and now abandoned.

BACKGROUND OF THE INVENTION

The present invention relates to novel compositions of matter, and more particularly, the subject invention concerns improved glass sealing compositions suitable for effectively assembling preformed component parts into a composite article of manufacture. Specifically, the instant invention pertains to new and unobvious thermally devitrifiable sealing glasses characterized by improved properties which make the sealing glasses suitable for fabricating items of commerce and science like cathode ray tubes, electronic components, encapsulated diodes without any apparent distortion or any deleterious effects on said item of commerce and science.

At present, the sealing glasses available to the art for joining preformed parts into a unitary composite item generally possess pronounced undesirable properties that often lead to serious fabrication problems. For example, the prior art sealing glasses may cure only at elevated temperatures and over an extended time, which curing property may lead to distortion of the joinable glass or glass ceramic parts or to physical damage to heat sensitive electronic components housed within a preformed glass structure. A further problem often evident in the prior art of sealing glasses is the poor flow for the sealing glasses. The poor flow of the sealing glass over the joinable surfaces or edges of the glass, ceramic or metal parts may prevent the intimate formation of an acceptable strong union of said parts. Also, of particular concern is the need for compatible thermal coefficient of expansion between the sealing glasses and the surfaces being sealed into a composite article. This latter property is important because, if the coefficients of the parts and the sealing glass are incompatible, the resultant will be an unacceptable mismatch and a concurrent failure as often exhibited by strain or like of the parts fused intimately one to the other.

There is a serious need for acceptable and workable sealing glass compositions for joining a number of important glasses, ceramics and metals for electronic use in the fields of both commerce and science. It will be appreciated by those skilled in the art to which the instant invention pertains that if novel and unobvious sealing glass composition having acceptable and workable properties are made available to the art, the presence of said sealing comopsitions would represent a substantial contribution and advancement to the art.

Accordingly, it is an object of the present invention to provide new and improved sealing glass compositions.

Another object of the instant invention is to provide novel sealing glass compositions that have desirable chemical and physical properties.

Yet a stil further object of the subject invention is to produce sealing glass compositions having acceptable workable properties for fabricating electronic items.

A still further object of the invention is to provide sealing glasses that have an improved cure temperature and an improved cure time, coupled with suitable flow and an acceptable coefficient of thermal expansion.

It is a further object of the present invention to overcome the difficulties associated with the prior art.

Other objects, features and advantages of this invention will become evident from the following detailed description of the mode and manner of practicing the invention.

SUMMARY OF THE INVENTION

This invention concerns novel sealing glass compositions wherein said compositions comprise a thermally crystallizable solder sealing glass of the lead-zinc-borate or lead borosilicate type, having blended therein 2 to 18 percent of a calcined zirconia vanadia silica stain. The novel sealing glass possesses desirable properties for making glass-to-glass, glass-to-metal, glass-to-ceramic, ceramic-to-metal fusion type seals and the like.

DESCRIPTION OF THE INVENTION

In attaining the objects of this invention, it has now been unexpectedly found that the subject sealing glasses with the desired flow, expansion and curing properties can be obtained by employing glass sealing compositions containing silicon oxide. ($SiO_2$), boric oxide ($B_2O_3$), lead oxide (PbO), aluminum oxide ($Al_2O_3$), copper oxide (CuO), zinc oxide (ZnO), alkali oxide ($M_2O$) wherein the alkali is sodium, potassium or lithium and the like glass forming oxides, having homogeneously and intimately dispersed therein calcined zirconia vanadia silica ($ZrO_2 \cdot SiO_2 \cdot V_2O_5$) stain, in an intimate inventive combination of these components to produce sealing glass compositions with good sealing properties.

Exemplary of sealing glass compositions to which the calcined zirconia vanadia silica stain compound can be added are a devitrifiable lead-zinc-borate sealing glass consisting essentially of 70 to 85 weight percent PbO, 6 to 15 weight percent ZnO 7 to 10 weight percent $B_2O_3$ and about 0 to 5 weight percent $SiO_2$, usually about 1 to 3 weight percent $SiO_2$. Another lead-zinc-borate sealing glass suitable for use herein consists of 70 to 85 weight percent pbO, 6 to 15 weight percent ZnO, 7 to 10 weight percent $B_2O_3$, 1 to 5 weight percent $SiO_2$ and 1 to 5 weight percent BaO; a lead-borate sealing glass consisting of 70 to 85 weight percent PbO, 7 to 15 weight percent $B_2O_3$, 2 to 10 weight percent $SiO_2$ and 1 to 5 weight percent $Al_2O_3$. These base sealing glasses have a coefficient of expansion in the general range of 100–115 × $10^{-7}$/°C (0–300°C). The glasses may also contain other glass-forming oxides such as $Na_2O$, $K_2O$, CuO, $SnO_2$, CaO and similar fluxes, colorants and the like. The sealing glasses as set forth supra usually contain homogeneously and intimately dispersed through about 2 to 18 weight percent calcined zirconia vanadia silica stain, with the presently preferred range of 5 to 12 weight percent. Generally, the linear thermal coefficient of expansion for the subject base sealing glasses will be lowered about 5 to 20 × $10^{-7}$/°C (0–300°C) from the subject modified glass composition.

The novel sealing glasses of the disclosed composition range can easily be prepared by employing techniques known to the art. For example, when small batches are formulated, the batch ingredients are intimately mixed by hand, or for larger batches, the ingredients are mixed in a commercially available blender. After the ingredients are homogeneously blended, they are heated to such temperature so that all of the glass-forming substances are present in the liquid state, thereby enabling the formation of a sealing glass from a homogeneous melt.

Generally, the batch ingredients were mixed well by hand and melting was done in a 90 percent platinum 10 percent rhodium crucible heated in an electric furnace in an air atmosphere. Often, a slight amount of oxygen may be present in the melting furnace, usually about 0.5 percent of $O_2$. The batch ingredients were continuously stirred during the melting and heating procedure.

The batch materials employed for preparing the sealing glasses of the invention were of high purity and they were selected from the following commercially available materials: $SiO_2$, Kona Quintus Quartz, or Ottawa Sand; PbO, lead silicate (85 percent PbO, 15 percent $SiO_2$), or red lead; $B_2O_3$, anhydrous boric oxide; ZnO, zinc oxide; $K_2O$, potash or potassium carbonate; CuO, cupric oxide; $Al_2O_3$, alumina and the like. Of course, the materials of the present invention may be in the form of functionally equivalent oxides, carbonates, fluorides, silicates, or any other form which does not disturb or adversely affect the subject glass composition.

The calcined zirconia vanadia silica stain employed herein can be easily obtained from commercial sources or it can be prepared by procedures well known to the art. One method for the preparation of calcined zirconia vanadia silica stain employs calcining a mixture of zirconium oxide, silicon and vanadium oxide wherein the zirconium oxide is present in the proportion from 0.8 to 8.5 times the weight of the silica and the vanadium oxide being present in proportions from 3 to 10.5 percent of the combined weight of zirconium oxide and silica. The mixture is calcinated at a temperature between 550°C. and 1300°C. The procedure described immediately above is set forth in British Pat. No. 625,448. Other procedures for the preparation of calcinated stains of the type used herein are set forth in U.S. Pat. No. 2,875,085.

The following examples are representative of embodiments of sealing glass compositions of the present invention and these examples are not to be construed as limiting as other obvious embodiments will be readily apparent to those versed in the art.

EXAMPLE 1

A sealing glass composition having a theoretical analysis of 2.3 weight percent $SiO_2$, 7.7 weight percent $B_2O_3$, 0.5 weight percent $K_2O$, 10.0 weight percent ZnO and 79.5 weight percent PbO was prepared by homogeneously and intimately blending 58 grams of commercially available Ottawa Sand No. 290, 18.4 grams of potash, 2023 grams of red lead, 196 grams of boric anhydride and 252 grams of zinc oxide. The substantially homogeneous mixture was melted in an electrically heated furnace in a platinum crucible. The melting and fining procedures were conducted at 2200°F. for about 25 minutes. Thereafter, the glass was poured out of the container and fritted in a conventional manner. The glass, in the devitrified dates, has a coefficient of expansion of about $113 \times 10^{-7}/°C$ (0–300°C).

EXAMPLE 2

A novel sealing glass composition of this invention was next prepared as follows: to 100 grams of the ground sealing glass prepared according to Example 1 was added 8 grams of calcined zirconia vanadia silica stain. The mixture of the sealing glass and calcined stain were thoroughly and homogeneously blended in a commerically available V-blender until an intimate mixture (usually about 1 hour) was obtained for the respective components. The commercially available calcined zirconia vanadia silica stain suitable for use herein generally contains 25 to 40 weight percent $SiO_2$, 55 to 70 weight percent $ZrO_2$ and 2 to 10 weight percent $V_2O_5$. The calcined stain used in this example was obtained from the Harshaw Chemical Company and it had an analytical composition of 32.38 weight percent $SiO_2$, 63.18 weight percent $ZrO_2$ and 3.92 weight percent $V_2O_5$. The commercially available stain can also be prepared according to the patent references set forth supra. The concentration of the components in this latter calcined zirconia canadia silica stain exhibits a concentration of zirconia of about twice the concentration of silica. The coefficient of expansion of the glass after the addition of the stain as measured on the devitrified glass is about $96 \times 10^{-7}/°C$ (0–300°C).

EXAMPLE 3

A lead-zinc-borate sealing glass having a theoretical analysis of 2.0 weight percent $SiO_2$, 8.4 weight percent $B_2O_3$, 74.8 weight percent PbO, 12.8 weight percent ZnO and 2.0 weight percent BaO was prepared by mixing 15.3 ounces of Ottawa Sand No. 290, 552 ounces of red lead, 62.3 ounces of boric anhydride, 88.3 ounces of zinc oxide, and 19.5 ounces of barium carbonate. The mixture was melted in an electrically heated furnace in a platinum crucible. The melting and fining procedures were conducted at 2400°F. to 2500°F., usually about 2450°F. for about 30 to 60 minutes, usually about 45 minutes. This glass was poured, fritted and ground to about 140 mesh size by conventional techniques. The sealing glass prepared from this batch and having the compositional range set forth above has a coefficient of expansion of about $103 \times 10\frac{1}{3}7/°C$ (0°–300°C).

EXAMPLE 4

A novel lead-zinc-borate sealing glass of the subject invention was next prepared as follows: to 100 grams of the ground sealing glass prepared according to Example 3 was added 2.5 grams of calcined zirconia vanadia silica stain. The proportion of the $SiO_2$ to $ZrO_2$ to $V_2O_5$ in the commercially available Harshaw Company stain was 3 to 6 to 0.3. The expansion of this glass is about $96.7 \times 10^{-7}/°C$ (0°–300°C).

EXAMPLE 5

The following table sets forth lead borosilicate and lead-zinc-borosilicate sealing glass in percent by weight to which from 2 to 18 percent of the calcined zirconia vanadia silica stain can be added to give typical thermally crystallizable sealing glasses:

TABLE 1

| Ingredients | 5 | 6 | Glass Number 7 | 8 |
|---|---|---|---|---|
| PbO | 79.5 | 78.0 | 74.99 | 80.6 |
| ZnO | 10.0 | 10.6 | 12.96 | 6.3 |
| $B_2O_3$ | 7.7 | 7.8 | 8.26 | 7.5 |
| $SiO_2$ | 2.3 | 2.4 | 2.10 | 3.5 |
| BaO | — | 1.2 | 2.03 | 2.1 |
| $K_2O$ | 0.5 | | | |

Each of these glasses, identified as 5 through 8 inclusive, may be used as a base glass for intimately mixing with the calcined zirconia vanadia silica stain. For example, separate composition of matter was formulated consisting of glass number 5 to which was added 5%, 7%, 8% and 8.5% of the the calcined stain. To base glass number 6 was added 5percent of the calcined stain, to base glass number 7 was added 2.5, 5 and 15 percent of the calcined stain, and, to base glass number 8 was added 8, 12 and 16 percent of the calcined stain. All of the stains and glasses were intimately blended to form a homogeneous uniform composition of matter. The calcined zirconia vanadia silica stain employed in Examples 5 through 9 was the commercially available Harshaw Chemical Co. stain. The stain had a chemical analysis of 32.38% $SiO_2$, 63.18% $ZrO_2$, 3.92% $V_2O_5$, and a physical analysis demonstrating an average particle size of 9.7 microns, with an average range of 80percent of the particles between 1 and 20 microns, usually between 4.4 to 16.8 microns. The emission spectrographic analysis shows a $SiO_2$, major (greater than 10 percent), $ZrO_2$, major (greater than 10 percent) and $V_2O_5$, major (greater than 10 percent). The crystals in the stain appear mainly as tabular prisms, and the stain crystals are pleochloric.

The sealing glass compositions of the instant invention are employed as sealing glasses for assembling glass, ceramic, or metal parts by conventional methods known to the art. The sealing glasses can be applied by hot and cold techniques. When the cold procedure is employed, the sealing glasses are ground and mixed with a suitable vehicle to form a paste. One acceptable vehicle is made of about 1 to 3, percent, usually about 1 to nitrocellulose in amyl acetate. Other acceptable organic binders or vehicles may be employed provided they will readily burn off and volatilize during the heating procedure of the sealing of the preformed glass, ceramic or metal part. In addition, the organic binder should not react with any of the elements making up the bonded assembly. Examples of other organic binders which can be used include gelatin dissolved in water, nitrocellulose and butylacetate, camphor with cellulose, and the like.

The sealing glass composition, mixed with the vehicle can be manually or mechanically applied by using a spatula, extrusion, cold dip, brush, roller coat, spray, doctor blade or any other like means. In the extrusion technique, which is usually employed for sealing a cathode ray tube face plate to its funnel, a toothpaste-like mixture a solder glass and carrier can be used to hold and dispense a uniform layer along the sealing edges of the respective parts.

After coating, with the sealing glass compositions of the instant invention and employing any of the sealing techniques discussed supra, the coated parts can be dried in an oven or by any suitable heating procedure. The dry assembled parts are then intimately bonded in an oven and finally cooled to room temperature.

While the above-detailed description is seen to illustrate the application of the sealing glass composition before the heating step, it is to be understood that the preformed parts to be assembled could be preheated, dipped and then fired.

Generally, when the hot method of application is employed, the solder glass composition is first melted in a suitable container, such as platinum or fused silica crucible or the like, to a temperature above the working point followed by dipping the preheated, preformed parts into the molten solder glass and then allowing the assembly to set for a few seconds. After the thus treated parts have slightly cooled, they are aligned for assembly and sealed in an oven heated to the sealing temperature.

The above examples are illustrative of sealing techniques, and it is to be understood that the sealing procedures disclosed herein are not intended to limit the instant disclosure, as other techniques will be obvious to those versed in the subject art.

The following examples are illustrative of the present invention and they are not to be considered as limiting the spirit and scope of the invention in any manner, as these and other variations will be readily apparent to those versed in the subject art.

EXAMPLE 6

Typical sealing glasses as dispersed in a carrier were prepared as follows: to 10 gram amounts of the sealing glasses as prepared according to the procedure as set forth in Examples 1–5 were incorporated in about 1½ percent nitrocellulose in amyl acetate as described according to the discussion as set forth immediately above.

EXAMPLE 7

The present examples demonstrate the effective seals that are uniformly obtained by using the novel composite sealing glasses of this invention. Color television funnels were sealed to color television faceplates by applying a sealing glass composition consisting of 79.5 weight percent PbO, 10 weight percent ZnO, 7.7 weight percent $B_2O_3$, 2.3 weight percent $SiO_2$ and 0.5 weight percent $K_2O$ having intimately dispersed therein 8 percent of calcined zirconia vanadia silica stain. This homogeneous blend was dispersed in a standard nitrocellulose amyl acetate vehicle, as set forth in Examples 1, 2 and 6 supra. After the first sealing glass was extruded onto the sealable surfaces, it was air dried for about 2 hours. The funnels and faceplates were next placed on a sealing rack and sealed in a conventional recirculating surface combustion oven. The furnace was gas fired. The sealing cycle consists of raising the heat at a rate of 10°C. per minute from room temperature to 425°C., holding the temperature at 425° for 60 minutes, then cooling to 250°C. at a rate of 5°C. per minute and finally to room temperature. The faceplate ahda a coefficient of expansion of $98.5 \times 10^{-7}$ °C(0°–300°C) and the funnel had a coefficient of expansion of $98.5 \times 10^{-7}$ °C (0°–300°C). The firmly sealed faceplate to funnel composition were tested for conventional stress measurements by sectioning a cut from the bulb and measuring the stress in pound per square inch at the center of the sectioned sample. The stress readings for the section as read at 3:00, 6:00, 9:00 00, and 12:00 for the faceplate was 285 C, 245 C, 290 C and 330 C. For the funnel the stress was 245 C, 335 C, 420 C and 415 C respectively. The glasses used to make the faceplate and the funnel are commercially available glasses. The composition of the faceplate glass is, in weight percent, as follows: 63.5 $SiO_2$; 4.4 $Al_2O_3$; 10.3 $K_2O$; 7.3 $Na_2O$; 5.2 CaO + MgO; 7.5 BaO; 0.1 PbO; 0.1 $As_2O_3$; and $Sb_2O_3$ 0.3. The composition of the glass used for making the funnel is, in weight percent, as follows: 59.2 $SiO_2$; 4.1 $Al_2O_3$; 7.3 $K_2O$; 7.4 $Na_2O$; 4.8 CaO; 3.2 MgO; 1.8 BaO; 9.4 Pbo; 0.1 $As_2O_3$; 0.2 $Sb_2O_3$; 1.8 $Rb_2O$; and 0.5 $Li_2O$. The letter C in the above reported results is an abbreviation for composition.

The novel, improved crystallizable type solder sealing glasses prepared in the above-described examples were further tested by standard glass evaluation tests to demonstrate the unexpected results of the present invention. A description of the standard test employed herein is set forth immediately below.

The conventional gradient boat test was conducted in a gradient furnace having a temperature range of 950°F. to 1950°F. over a ten-inch span boat. A ten-inch boat is filled with a fritted glass and placed into the furnace for one hour. The temperature is measured at about one-inch intervals over the boat every 5 minutes before removal to establish the temperature gradient. After cooling, the glassy and crystal edges of the sample are measured and recorded. This test indicates the primary flow range of the sealing glass, which is from glassy to crystallization edge.

The button flow test was employed to determine the flow characteristics of a given crystallizable solder glass. The button flow test aids in demonstrating the filleting properties of the glass which can be related to actual seal filleting. The test consists essentially of making ten-grain pressed cylinders or pellets of solder glass with a diameter of ¾ inch under a pressure of about 1000 psi, placing each pellet or cylinder in the center of a glass plate 2 × 2 × ¼ inches and heating said button in a furnace until the temperature stabilizes at 150°F. with a temperature rise of 7° to 10°C. per minute to 425° to 450°C., holding the temperature at 425° to 450°C. for 60 to 70 minutes, and then cooling at a rate of 1°C. per minute to 330°C. The diameter of the heat treated finally cooled button is measured and compared against buttons of a standard similarly treated glass button fired at the same time.

A seal stress test was conducted to determine if the glasses can be satisfactorily processed without breakage due to high seal stress. The test was conducted by cutting a piece of base glass into one inch sections and one end of two sections were ground, polished, annealed and wiped with acetone. A small pellet of solder glass, formed in a pellet die, was placed on one end of each glass section and a drop of the nitrocellulose in amyl acetate vehicle was placed on top of the pellet. The seals were made by heating in an electric oven at 425°C. to 450°C. for 60 to 70 minutes with a temperature use to said temperature 10°C. per minute. The sealed samples were cooled at the rate of 5°C. per minute. The seal stress was read in a polarimeter and calculated to psi. The readings and calculations were made in the base glass. The base glass is a commercially available glass consisting of 63.5 weight percent $SiO_2$, 4.4 weight percent $Al_2O_3$, 10.3 weight percent $K_2O$, 7.3 weight percent $Na_2O$, 52 weight percent CaO + MgO, 0.3 weight percent $Sb_2O_3$, 7.5 weight percent BaO and 0.1 weight percent PbO. The stress in the solder glass is found by reversing the direction of the psi values.

The differential thermal analysis, D.T.A., was made by heating a 100 mg. sample in a conventional, commercially available duPont 900 Differential Thermal Analyzer. The analysis is performed as follows: A sample, usually about 100mg. in weight, is placed into a small glass vial and is then inserted into the sample contained in said vial to record the temperature of the sample.

In a similar vial are placed glass beads that are inert over the testing temperature range; and, into these beads is placed a similar thermocouple to control the rate at which the temperature rises. Next, heat is applied to the glass beads so that they are heated at a rate of 10°C. per minute. The two vials are heated simultaneously and uniformly by the same heat source. Any possible reactions that may occur within any material manifest either an exothermic or endothermic behavior. Therefore, when a reaction occurs in the test sample, the thermocouple records the difference of the temperature of the test sample and that of the controlled glass beads. The differences that occur are recorded on a chart and this produces what is known as a D.T.A. curve. This curve demonstrates the exothermic and endothermic reactions that have occurred within the test sample over the selected temperature range.

The results of the various tests discussed supra are set forth in the table immediately below. In the table, composition A is a novel sealing glass consisting of 79.5 weight percent PbO, 10.0 weight percent ZnO, 7.7 weight percent $B_2O_3$, 2.3 weight percent $SiO_2$ and 0.5 weight percent $K_2O$ having homogeneously dispersed therein 8 percent of calcined zirconia vanadia silica stain. The homogeneous composition was intimately dispersed in a standard nitrocellulose amyl acetate vehicle. The preparation of this glass and its vehicle are set forth in Examples 1, 2 and 6. In the table, glass B has the same composition as glass A, with the exception that glass B does not contain any calcined zirconia vanadia silica stain dispersed with glass B. The glass identified as glass C has the following ingredients: 74.99 weight percent PbO, 12.96 weight percent ZnO, 8.26 weight percent $B_2O_3$, 2.10 weight percent $SiO_2$, 2.03 weight percent BaO and 2.5 percent of the calcined zirconia vanadia silica stain homogeneously and intimately blended throughout said sealing glass. The glass labeled as D is the same as glass C, except that there is no calcined stain in glass D. In the table, D.T.A. is an abbreviation for Differential Thermal Analysis, PSI for pounds per square inch, C for compression, and T for tension.

TABLE 2

| Test | A | B | C | D |
|---|---|---|---|---|
| Gradient Boat | | | | |
| Glassy Edge | 342°C | 350°C | — | 368°C |
| Crystal Edge | 406°C | 410°C | — | 427°C |
| Button Flow | | | | |
| Average Diameter | 1.085″ | 1.188″ | 1.020″ | 1.062″ |
| Rod Seal Stress | | | | |
| PSI In Sealing Glass | | | | |
| at 415 | 20T | | 525T | |
| at 425 | 700C | 1625T | 350C | 800T |
| at 435 | 1100C | | 850C | |
| D.T.A. Time to | | | | |
| Isothermal Peak Minutes | 20.5 | 27.5 | 45.0 | 70 |
| Expansion Coefficient | | | | |
| × $10^{-7}$/°C (0-300°C) | 96.4 | 108 | 96.7 | 103 |

DESCRIPTION OF THE DRAWINGS

In the accompanying FIG. 1, the stress is depicted in a sealing glass consisting essentially of 2.3 weight percent $SiO_2$, 7.7 weight percent $B_2O_3$ 10 weight percent ZnO, 79.5 weight percent PbO and 0.5 weight percent $K_2O$ with varying percents of calcined zirconia vanadia silica stain added to the sealing glass composition. The sealing glass was firmly sealed to a glass rod with a diameter of about ½ inch and cured at 425°C. FIG. 2 shows the thermal expansion, illustrated as tension, of a second sealing glass with the following composition, 3.5 weight percent $SiO_2$, 7.5 weight percent $B_2O_3$, 6.3 weight percent ZnO, 80.6 weight percent PbO and 2.1 weight percent BaO is lowered when the calcined zirconia vanadia silica stain is added in various concentrations to the sealing glass composition. The glass used as the rod to which the seals were made had a composition of 70.6 weight percent $SiO_2$, 0.2 weight percent $B_2O_3$, 2.0 weight percent $Al_2O_3$, 0.3 weight percent $K_2O$, 13.4 weight percent $Na_2O$, 7.2 weight percent CaO, 5.3 weight percent MgO, and 1.0 weight percent BaO. The sealing temperature for the second sealing glass was effected at 380°C. The data presented herein indicates that unobvious flow properties, complete crystallization in less than 60 minutes at lower temperatures and a lowering of the thermal expansion are obtained for the novel compositions of this invention. The sealing glass produces, in addition to the other desirable properties set forth above, strong seals and good electrical properties.

Figure 1:
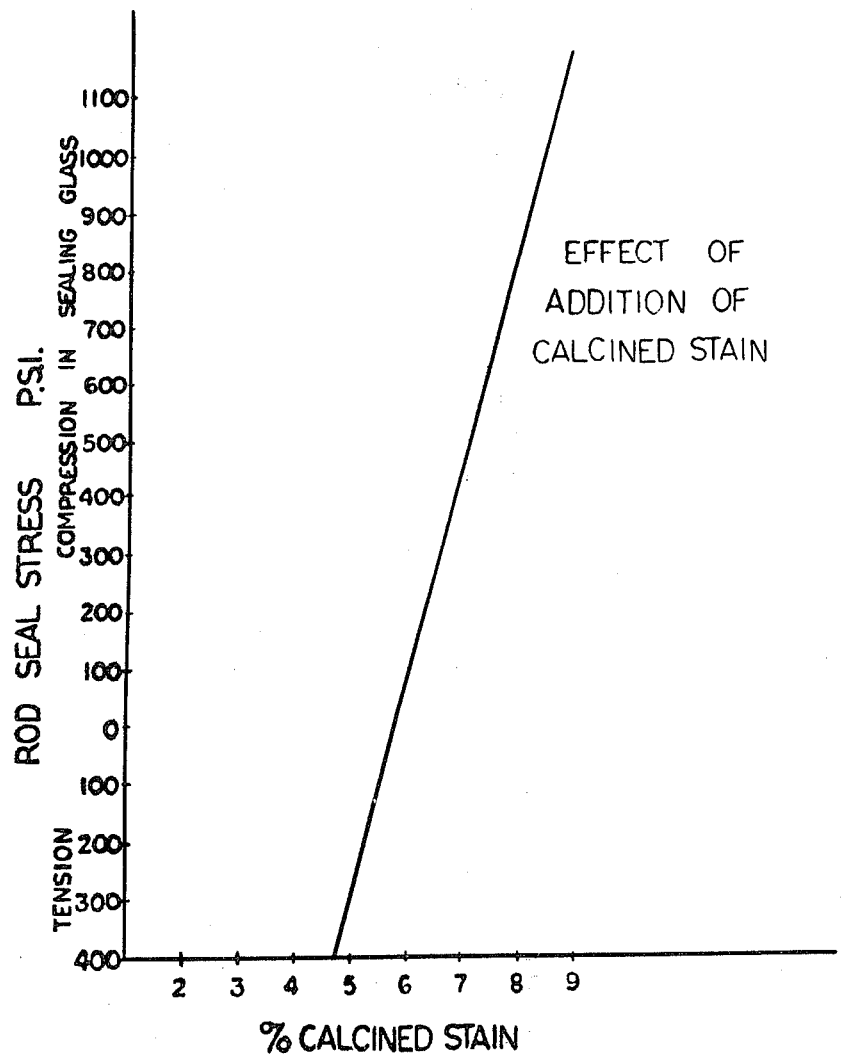

The sealing glass compositions of the present invention can be employed to manufacture items of science and commerce. For example, the sealing glasses are ideally suited for sealing television color tubes because the sealing glass cures at 425 ± 10°C., which cure property is needed for sealing color tubes. The subject glasses as shown in FIG. 1 cure about 20° lower than the presently available sealing glasses. Additions of calcined stain lower the crystallization temperature of sealing glasses from 10° to 15°C. The sealing glasses can also be used for joining metallic alloys to glass parts in the fabrication of electronic components, for joining glass to ceramics and the like.

While the illustrative embodiments of the invention have been described with particularity, it will be understood that various modifications will be apparent and can readily be made by those skilled in the art without departing from the scope and spirit of the invention.

I claim:

1. A composite article comprising at least one preformed surface of a material selected from at least one of the group of glass, ceramic, metal and metallic alloy and having a fusion-type sealing composition thereon consisting essentially of a base sealing glass having a sealing temperature below the deformation temperature of said preformed surface and being selected from the group consisting essentially of lead-zinc-borate and lead-borosilicate sealing glasses, said base sealing glass having from about 2 to about 18 percent by weight of a calcined zirconia vanadia silicia stain homogeneously blended therein, said fusion-type sealing composition possessing the property of being devitrifiable to produce a devitrified fusion-type seal having a thermal coefficient of expansion ranging from about $5 \times 10^{-7}$ in./in./°C. (0°–300°C.) to $20 \times 10^{-7}$ in./in./°C. (0°–300°C.) lower than the same sealing glass composition would possess upon being devitrified without any zirconia vanadia silica stain being blended therein.

2. A composite article according to claim 1 wherein said base sealing glass consists essentially of 70 to 85 weight percent PbO, 6 to 15 weight percent ZnO and 7 to 10 weight percent $B_2O_3$ and 0 to 5 weight percent $SiO_2$.

3. A composite article according to claim 1 wherein said base sealing glass consists essentially of 70 to 85 weight percent PbO, 7 to 15 weight percent $B_2O_3$, 2 to 10 weight percent $SiO_2$ and 1 to 5 weight percent $Al_2O_3$.

4. A composite article according to claim 1 wherein said calcined zirconia vanadia silica stain possesses the property of lowering the crystallization temperature of said base sealing glass by about from 10°C. to 15°C.

5. A composite article according to claim 1 wherein said base sealing glass has homogeneously blended therein about 8 percent by weight of said calcined zirconia vanadia silica stain.

* * * * *

UNITED STATES PATENT AND TRADEMARK OFFICE
CERTIFICATE OF CORRECTION

PATENT NO. : 3,922,471
DATED : November 25, 1975
INVENTOR(S) : J. L. Ellis

It is certified that error appears in the above–identified patent and that said Letters Patent are hereby corrected as shown below:

Col. 1, line 54, "comopsitions" should be --compositions--; Col. 1, line 62, "stil" should be --still--; Col. 2, line 42, "pbO" should be --PbO--; Col. 4, line 38, "10 1/3$^7$/°C" should be --10$^{-7}$/°C--; Col. 5, line 31, after "to" insert --2%--; Col. 5, line 30, after "3" delete the comma "(,)"; Col. 6, line 45 "ahda" should be --had a---; line 48, "composition" should be --composites--; line 53, "9:0000" should be --9:00--; line 66, "composition" should be --compression--; Col. 8, line 57, after "B$_2$O$_3$" insert a comma --(,)--.

Signed and Sealed this

Tenth Day of May 1977

[SEAL]

Attest:

RUTH C. MASON
Attesting Officer

C. MARSHALL DANN
Commissioner of Patents and Trademarks